United States Patent
Olofsson et al.

(10) Patent No.: US 8,208,934 B2
(45) Date of Patent: Jun. 26, 2012

(54) METHOD FOR ALLOCATING COMMUNICATION RESOURCE IN A TERRESTRIAL WIRELESS COMMUNICATION SYSTEM

(75) Inventors: Henrik Olofsson, Stockholm (SE); Johan Johansson, Stockholm (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 498 days.

(21) Appl. No.: 12/433,216

(22) Filed: Apr. 30, 2009

(65) Prior Publication Data

US 2009/0253435 A1    Oct. 8, 2009

Related U.S. Application Data

(63) Continuation of application No. PCT/CN2006/002914, filed on Oct. 31, 2006.

(51) Int. Cl.
*H04Q 7/20* (2006.01)

(52) U.S. Cl. .......... 455/450; 455/452.1; 455/452.2; 370/329

(58) Field of Classification Search .......... 455/450, 455/452.1, 452.12; 370/329
See application file for complete search history.

(56) References Cited

U.S. PATENT DOCUMENTS

| | | | |
|---|---|---|---|
| 6,907,243 B1 * | 6/2005 | Patel | 455/442 |
| 7,773,514 B2 * | 8/2010 | Kaminski et al. | 370/230.1 |
| 2002/0196749 A1 * | 12/2002 | Eyuboglu et al. | 370/328 |
| 2004/0131026 A1 | 7/2004 | Kim et al. | |
| 2004/0214574 A1 * | 10/2004 | Eyuboglu et al. | 455/439 |
| 2005/0243761 A1 | 11/2005 | Terry et al. | |
| 2008/0075119 A1 | 3/2008 | Zhang et al. | |

FOREIGN PATENT DOCUMENTS

| | | |
|---|---|---|
| CN | 1496161 | 5/2004 |
| CN | 1684543 | 10/2005 |
| CN | 1722892 | 1/2006 |
| WO | WO-2004064289 | 7/2004 |

OTHER PUBLICATIONS

Office Action, mailed Mar. 1, 2010, in corresponding Chinese Application 200680041395.3.
International Preliminary Report on Patentability, mailed May 5, 2009, in corresponding International Application PCT/CN2006/002914.
Chinese Office Action issued Mar. 3, 2011 in corresponding Chinese Patent Application 200680041395.3.
Office Action, mailed Jun. 23, 2011, in Chinese Application No. 200680041395.3.

* cited by examiner

*Primary Examiner* — Danh Le
(74) *Attorney, Agent, or Firm* — Staas & Halsey LLP (57) ABSTRACT

Embodiments of the present invention disclose a method for allocating communication resources for communicating data in a terrestrial wireless communication system including a first set of radio transmitters, at least part of said radio transmitters being used by a coordination entity, and the method comprises: sending an inquiry from said coordination entity, requesting a representation of communication resources available for allocation in each of at least a subset of said first set of radio transmitters, said subset being used by said coordination entity; obtaining a response to said inquiry, said response comprising a representation of available communication resources of said subset of radio transmitters; and based on said response, allocating communication resources from said first subset of radio transmitters. Embodiments of the present invention also disclose a communication system and a radio transmitter.

17 Claims, 5 Drawing Sheets

METHOD FOR ALLOCATING COMMUNICATION RESOURCE IN A TERRESTRIAL WIRELESS COMMUNICATION SYSTEM

CROSS-REFERENCE TO RELATED APPLICATION

This application is a continuation of International Application No. PCT/CN2006/002914, filed on Oct. 31, 2006, which is hereby incorporated by reference in its entirety.

FIELD OF THE INVENTION

The present invention relates to the field of communication, and particularly, to a method, a communication system and a radio transmitter for allocating communication resources in a terrestrial wireless communication system.

BACKGROUND OF THE INVENTION

Terrestrial broadcast services for small mobile devices with small antennas, e.g. Mobile TV and other multimedia services, is an area that has gained a lot of attention. For example, Multimedia Broadcast and Muilticast Services (MBMS) have been defined and developed for GSM and WCDMA mobile systems, as well as for CDMA2000 systems.

Figure 1:
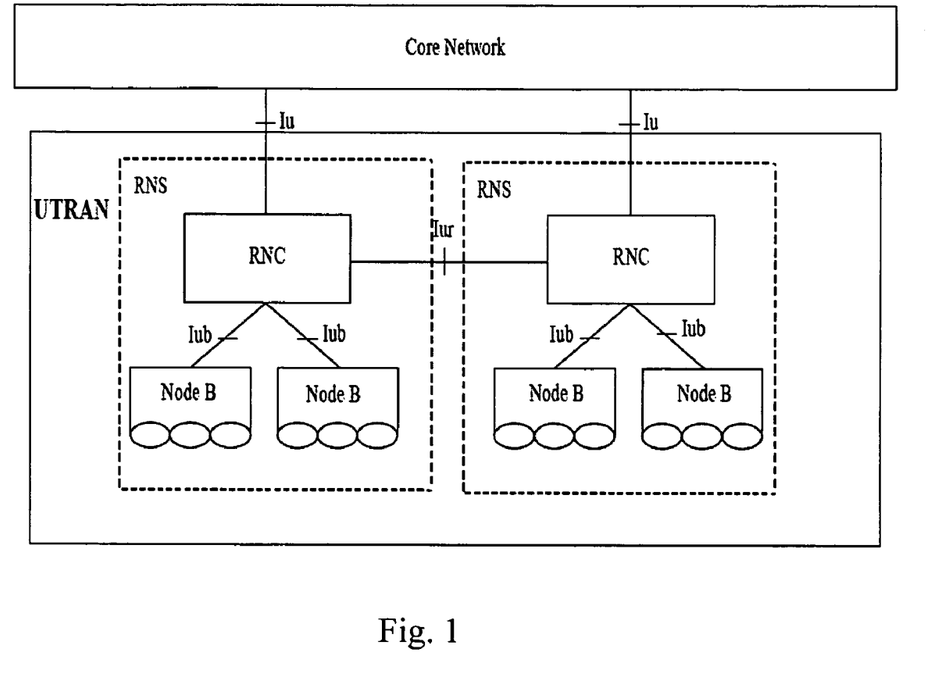
FIG. 1 shows a conventional Universal Mobile Telecommunication System.

One such system is the Universal Mobile Telecommunication System (UMTS). UMTS employs a Universal Terrestrial Radio Access Network (UTRAN), consisting of a set of Radio Network Subsystems (RNS) connected to a Core Network through an interface (the Iu interface). Each Radio Network Subsystem usually includes a plurality of radio base stations (Node Bs) connected to an RNS specific Radio Network Controller (RNC) through the Iub interface. This is illustrated in FIG. 1.

In UTRAN, the radio resource for a radio link in one cell (one Node B may support a plurality of cells, e.g., 3, 6, 9) is defined by a chammelisation code. When a radio link is set up between a UE and a Node B, this code is selected by the RNC.

The increasing communication resource demands, however, has resulted in development of even newer technologies, and the UMTS system is expected to evolve into a high speed Orthogonal Frequency Division Multiple Access (OFDMA) system, in 3GPP currently denoted Long Term Evolution (LTE). MBMS services in LTE are presently called evolved MBMS, or eMBMS.

Similar to UMTS, multimedia broadcast and/or multicast transmissions in LTE may be transmitted in a single cell or in a group of cells. In case of multi-cell transmission, however, LTE differs from CDMA systems in that Single Frequency Network (SFN) operation mode is assumed for these transmissions, i.e. the transmission is synchronized in such a way that the UE may combine the energy from multiple transmissions from different cells without additional receiver complexity. SFN transmission is possible if identical information is transmitted from different cells in "the same" physical radio resource at the same time using the same coding scheme. In OFDMA, which, as stated above, is used in LTE, a physical radio resource is defined by a set of frequencies and a time slot.

Accordingly, mobility in an SFN network is seamless without explicit handovers. SFN transmissions, however, suffer from a more complicated communication resource allocation as result since the allocations in an SFN service area must correspond in frequency and time.

Although UMTS UTRAN employs macro diversity for voice calls, i.e., the UE is connected to more than one Node B and the same information is transmitted and received by these Node Bs, this voice call information is encoded differently since every UMTS node B employs a Node B-unique scrambling code on all transmissions. The UE must therefore assign different receiver resources for each Node B to be able to decode signals from two or more Node Bs. When employing broadcast and/or multicast services such as mobile TV in the UMTS system, the broadcast transmission will be transmitted from different Node Bs using Node B unique scrambling codes, however, there is no combination of transmissions from different cells.

The introduction of MBMS, denominated evolved MBMS or eMBMS in LTE, thus has introduced additional communication resource allocation issues when introducing SFN transmissions.

This allocation is further complicated by the architecture of LTE, since in LTE there is no central node (RNC) controlling multiple Node Bs. Instead, in LTE, the functionality for selecting physical radio resources is located at the Node B. Further, the system may be arranged so that different service providers may independently initiate broadcast and/or multicast transmissions in the same or partially overlapping portions of the radio access network. For example, the radio access network may be divided into overlapping service areas, which are configured by O&M and used to select which service shall be available in a certain area. For example, service area "Stockholm Globe Arena" would be overlapping with service areas "Stockholm" and "Major Swedish Cities". Furthermore, Service Areas being smaller than the possible SFN area could be expected to be a common case, e.g., at sports events, covering airports, train stations, etc.

Consequently, the probability that at least part of resources requested for a SFN transmission are already occupied in one or more of the requested Node Bs, or radio transmitters of a single Node B, may be quite great, in particular when considering a rather large coverage area. If the resource is occupied, the resource activation would fail in those Node Bs and must be performed again for all the Node Bs in the area. Consequently, the resource allocation may be time consuming.

Accordingly, there exists a need for a more efficient method for allocating communication resources in a terrestrial wireless communication system, in particular for SFN transmissions.

SUMMARY OF THE INVENTION

A method and a communication system for allocating communication resources for communicating data in a terrestrial wireless communication system are provided.

According to an embodiment of the present invention, at least parts of a plurality of radio transmitters are being used by a coordination entity, such as an LTE Multi-cell/multicast entity. The method includes: sending an inquiry from said coordination entity, requesting a representation of communication resources available for allocation in each of at least a subset of said first set of radio transmitters, said subset being used by said coordination entity; obtaining a response to said inquiry, said response comprising a representation of available communication resources of said subset of radio transmitters; and based on said response, allocating communication resources of said first subset of radio transmitters. The communicated data may consist of point to multipoint multimedia broadcast and/or multicast transmissions, i.e., transmissions from one radio transmitter to a plurality of receivers.

The invention is described in more detail below with reference to the appended drawings which illustrate exemplary embodiments of the invention.

DETAILED DESCRIPTION OF PREFERRED EMBODIMENTS

Today, wireless communication systems are widely used for unicast transmission, i.e. point-to-point transmission of data. Typical unicast user services include voice-calls, video-calls, internet web-browsing, messaging, etc.

As has been stated above, however, broadcast services, such as mobile TV in wireless communication systems, is an area that has gained a lot of attention. Multimedia Broadcast and Multicast Services (MBMS) constitute point-to-multipoint services in which data is transmitted from a single source entity to multiple recipients. Transmitting the same data to multiple recipients has the advantage that it allows network resources to be shared among a plurality of users, i.e., any number of UEs in a cell or cells wherein the MBMS transmission is present may receive the transmission if they are authorized to do so. Consequently, MBMS provides a method that allows a considerably more efficient way of using the communication resources, at least for popular services since transmission resources in the core and radio network are shared. MBMS may use advanced calculations to decide, whether or not unicast radio channels lead to a more efficient system usage than a broadcast radio channel.

MBMS could be regarded as a higher layer network overlaid on an existing wireless communication network, e.g., UMTS or LTE. The MBMS services are distributed to mobile users by means of a Broadcast Multicast Service Centre (BM_SC), which provides a set of functions for MBMS User Services. The BM_SC, in turn, receives services to be transmitted to mobile uses from one or more content providers. Usually, there are more than one content provider, e.g., various TV and/or radio channels. BM_SC is responsible for encryption of these services and delivery to the end users by means of the radio network. The broadcasted services may either be free, e.g., radio channels may be broadcasted free for anyone to listen to, or charged, in which case the BM_SC provides paying subscribers with keys for decryption of encrypted services, and when an MBMS session is set up, the BM_SC allocates communication resources.

Although MBMS substantially will increase the radio resources usage in CDMA systems such as UMTS, it has been concluded that communication resources can be utilised to an even greater extent by using other techniques, such as a high speed Orthogonal Frequency Division Multiple Access (OFDMA) system.

Figure 2:
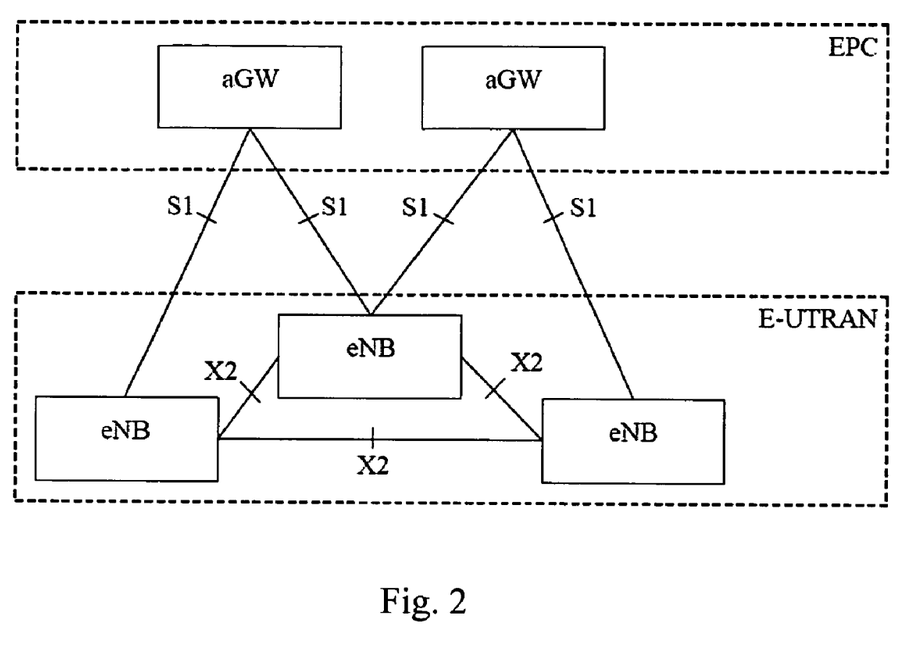
FIG. 2 shows a conventional Long Time Evolution system.

The 3GPP work on OFDM is called Long Time Evolution, and as can be seen when comparing FIG. 2, which discloses an LTE network, with FIG. 1, in LTE the central node (RNC) in UMTS controlling multiple Node Bs has been removed and instead only two kinds of nodes, evolved Node B (eNB) and access Gate Way (aGW) are defined, where the eNB belongs to the evolved UTRAN (E-UTRAN) and the aGW belongs to the evolved packet core (EPC). This imposes a difference regarding MBMS communication resource allocation between UMTS and LTE. In UMTS, each Radio base station (Node B, wherein each Node B includes one or more radio transmitters) is controlled by a single radio network controller (RNC), and when an MBMS service is to be set up, the BM_SC requests communication resources from one or more RNCs controlling the cell or cells in which the particular session is to be set up.

Since no RNC is present, allocation of communication resources in LTE is at present controlled by each eNB. In this way, the eNB may function as an RNC, since a single eNB may comprise a plurality of radio transmitters. The LTE system, however, is subject to other difficulties than an RNC since in LTE Single Frequency Network (SFN) transmissions are expected to constitute a considerable part of the communication in the network. As stated above, it is critical for SFN transmissions that the same communication resources are allocated in the coverage area in which the MBMS service is to be provided, e.g., the same frequency subbands at the same time. Although setting tip of an MBMS transmission may be problematic, a situation with even more difficulties when setting up a communication involving specific resources of different radio transmitters will be discussed first.

As stated above, there is no RNC in an LTE network. This may lead to resource usage conflicts since there is no control node having knowledge of resource usage in the eNBs. Further, an LTE network may be shared by a plurality of operators, and when a plurality of competing content providers utilise the same radio network using different operators for transmission of their MBMS services, the probability of resource usage conflicts increase even further, i.e., the requested resources are already allocated by another entity.

Consequently, when there are ongoing MBMS services or sessions, setting up of a new MBMS session in SFN mode may be time consuming due to the great probability that the resources already are occupied for another, already ongoing SFN transmission, and that following allocation attempts has to be performed since there is no controller having knowledge of resource usage in each specific cell, at least not regarding cells of different eNBs.

The channel allocation is further complicated due to the fact that MBMS transmissions may be overlapping, partially overlapping or non-overlapping as described above.

One solution with this problem would be to pre-define resources to be used for eMBMS SFN transmission, for example by using O&M. The drawback with such a solution, however, would be that the system would not be able to adjust to variations in demand.

Figure 3:
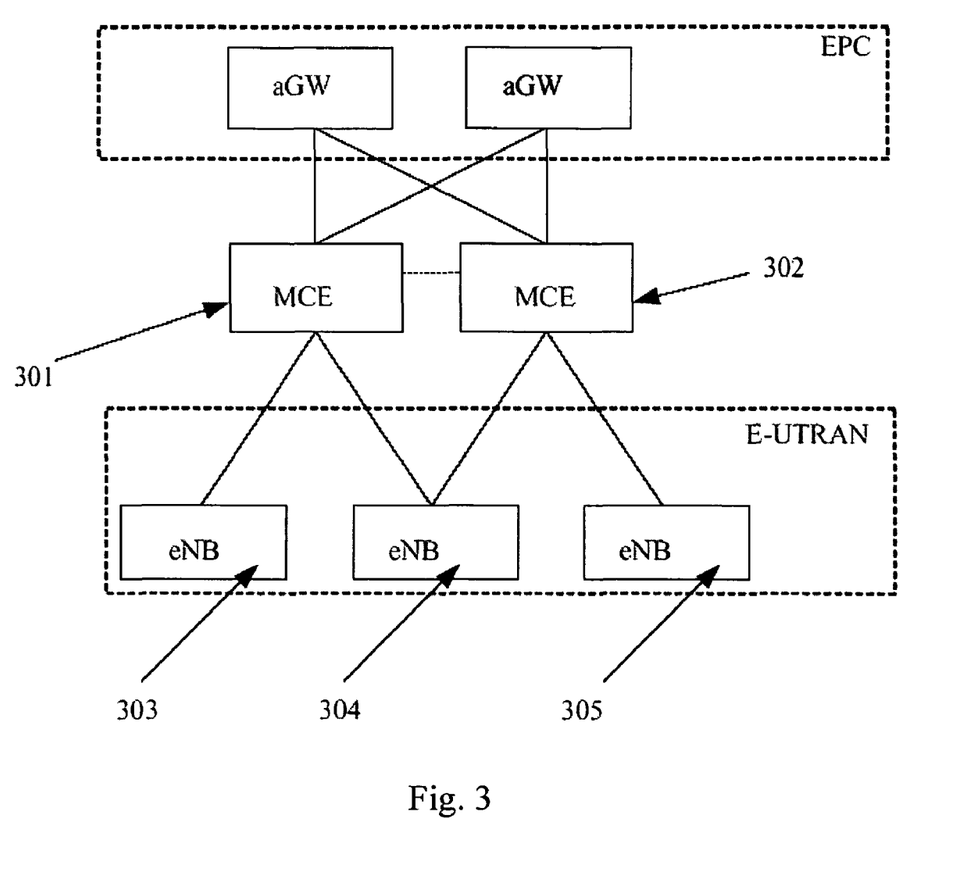
FIG. 3 shows a system according to a first embodiment of the present invention.

FIG. 3 discloses an exemplary system according to an embodiment of the present invention which solves the above problems. The system in FIG. 3 is similar to the system in FIG. 2, however with the difference that two Multi-cell/muilticast coordination entities (MCE) 301, 302 have been added and located between the aGWs and the eNBs. The task of the MCEs is to coordinate the usage of radio resources between different eNBs, and may be controlled by different operators. As can be seen in the figure, each MCE controls a plurality of Node Bs, i.e., MCE 301 controls a first set of eNBs 303-304 and MCE 302 controls a second set of eNBs 304-305. As also can be seen in the figure, said first set and said second set is partially overlapping, i.e., eNB 304 is controlled both by MCE 301 and MCE 302. Although the two sets are different in FIG. 3, it is apparent that the two sets of eNBs can be identical, i.e. both MCEs controlling all eNBs. The architecture of FIG. 3 has the advantage that a single radio communication network may be shared by two network operators, wherein each network operator includes its own BM_SC for managing MBMS transmissions in the network.

The MCEs may be located in a separate, new node introduced into the LTE architecture as shown in FIG. 3; alternatively, the MCEs may be located in an eNB or in an aGW.

The radio resources coordinated by the MCE may be the physical radio resources or some other entity with a unique relation to the physical radio resources.

The MCE is triggered by a request from, e.g., its corresponding BM_SC via an aGw to provide eMBMS SFN transmission for a set of cells forming a conterminous coverage area.

Contrary to synchronized reconfiguration procedures earlier used in 3GPP, which only contains two phases, Preparation and Activation, wherein the Node B has the option to accept or reject the preparation, the functionality of the MCE can be divided into three phases, wherein a novel inquiry phase has been added. During the inquiry phase, the MCE identifies suitable resources available in the desired coverage area (determined, e.g., by means of a request from BM_SC), e.g., eNBs 303-304 in FIG. 3, and when this is done, a decision is made about which resources to use.

Figure 4:
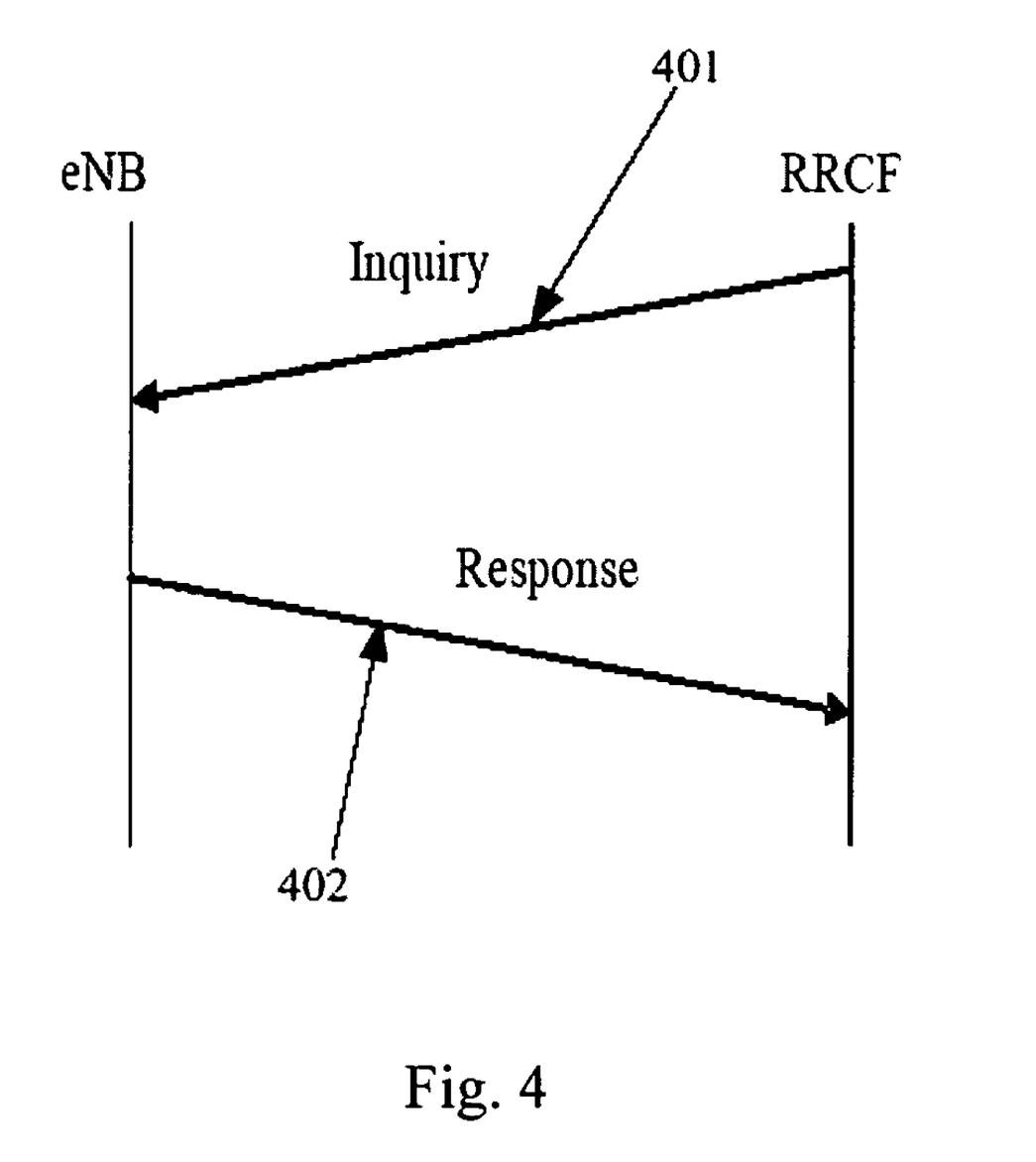
FIG. 4 shows a first exemplary embodiment of an inquiry phase according to an embodiment of the present invention.

In FIG. 4, a first exemplary embodiment of the inquiry phase is shown. The inquiry phase starts with an inquiry signalling phase, where the MCE inquires 401 the current resource usage from all the eNBs that are used by the MCE, e.g. eNBs 310-314 for MCE 308 in FIG. 3. This inquiry is performed by requesting each eNB to report the current resource usage. The eNBs then report to 402 about which resources are currently occupied by other MBMS SFN transmissions. This would give the MBMS the information needed to select resources for the new MBMS request. As an alternative, the eNB could also report the available resources, but this may require more signalling, assuming that most resources are used for other traffic than eMBMS SFN traffic. Another option would be to let the eNB report either the available or the occupied resources depending on which would require the least amount of resources to be signalled to the MCE. In addition to other SFN transmissions, communication resources may, e.g., be occupied by persistently scheduled allocations or control channels.

When the MCE has received a response from the inquired eNBs, and is aware of the current resource usage within the requested coverage area, the responses are used in an inquiry decision phase to determine a suitable communication resource allocation for the requested MBMS transmission. The MCE preferably choose resources that are available in the entire area. If there are many possible resources to choose from, there may also be other factors affecting the actual selection of resources. One example is that it is beneficial for the UE if the information belonging to one MBMS service is transmitted with high data rate during a short time using a plurality of subbands. This may enable the UE to power-off the receiver between transmissions and thereby reduce the power consumption.

The inquiry phase is then followed by a preparation phase 403, in which the MCE signals the determined resource usage to the eNBs, i.e., allocates the resources. The eNB can then prepare the usage of the resources. It could, for example, be assumed that resources used for dynamically scheduled resources and semi-persistent allocations according to the above could be reallocated, if the resource usage collides with the resource request for SFN traffic, although reallocations of semi persistently allocated resources may be time consuming as described above.

Preferably, the eNBs are configured to respond to the resource request from the MCE. In this response, the eNB should signal the time when the resources are available for usage. This time may differ to a great extent among various eNBs, depending on current kind of usage of the resources. The MCE may then use the largest of these reported values when deciding when to send the activation message to all the eNBs.

When an eNB receives a resource request, and responds to the MCE, e.g., with an activation time, the communication resources are reserved in the eNB for a predetermined period of time. If no allocation request is received within said time period, communication resources are free for allocation by another entity, such as another MCE.

Figure 5:
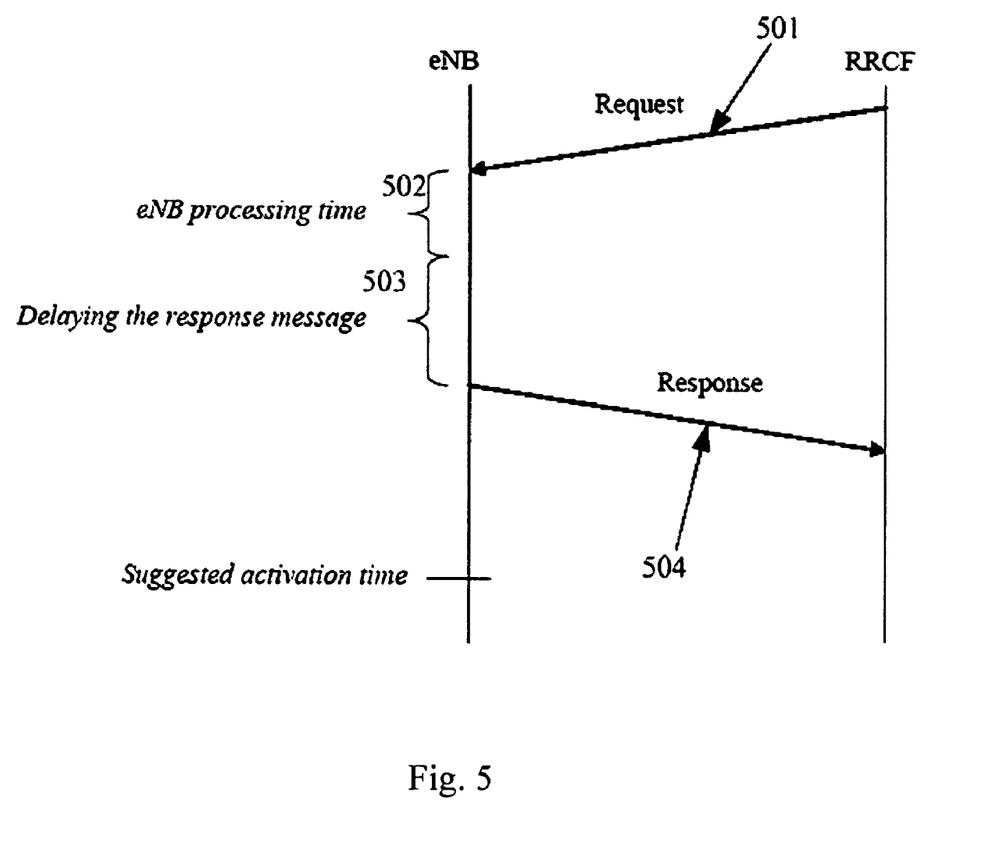
FIG. 5 shows a method for delaying inquiry responses according to an embodiment of the present invention.

In an embodiment, all eNB will respond to this request from the MCE. This may lead to extensive simultaneous signalling, in particular when the requested SFN area is large and includes a plurality of eNBs. FIG. 5 illustrates a solution to this problem. When an eNB receives a request 501 from the MCE, the request is followed by an eNB processing time 502, at which a proper response to the MCE is calculated. Instead of immediately sending a response to the MCE, however, the response messages from the various eNBs are distributed in time, for example by delaying each response by a time period 503 that is related to the suggested activation time. Thereby, the eNB may delay the response in proportion to the activation time, i.e., the longer the activation time, the longer delay, but it is of course important that the response message arrives at the MCE well before the suggested activation time. The eNB may also take signalling delays between eNB and MCE into account when setting this delay. The delay may, of course, be calculated in any suitable way, e.g., inverse proportional to the activation time or by using a random delay. At any rate, delaying the messages has the advantage that the simultaneous signalling intensity is reduced.

As an alternative to all eNBs signalling activation times, only eNBs with an activation time larger than a certain value may be configured to report activation times. The specific value may be set by the MCE in the resource request.

As a further alternative, the MCE do not request the eNB to report activation time at all. In this case, the activation time must be defined in advance, taking into account the maximum delay for activation. Further, the following should be considered:

The possible duration of persistent scheduling of resources that may be used for the SFN transmission or resources to which other transmissions may be rescheduled, the delay for persistently scheduled traffic could be considerable; and The eNB processing time, i.e., the time it takes for the eNB to reallocate occupied portions of the requested resources.

This delay between preparation and activation phase could then for example be signalled by the MCE in the preparation request message, or defined in all eNBs by parameter setting (e.g., through Operation & Maintenance).

The preparation phase is similar to the current 3GPP synchronized reconfiguration preparation. The main difference is that the time for possible Node B reconfigurations of other traffic streams must be taken into account. For persistently scheduled traffic, the delay could be considerable as stated above.

The eNB may be requested to respond 504 to the MCE when the resources are available for usage, e.g. when eNB has finished unicast reconfigurations for these resources.

The preparation phase is followed by an activation phase. As described above, the start of the activation phase can either be explicitly signalled at the preparation or activation phase or be implicitly started after waiting a certain time after the preparation. As mentioned above, the activation time may be explicitly signalled or signalled during the preparation phase, or be immediate.

The main benefit of having an activation time, as compared to immediate activation, is in situations where the preparation phase takes different amount of time for different eNBs (e.g. at re-allocation of unicast resources or pre-emption of SFN resources for some eNBs). The eNBs may then continue to use the requested resources for other dynamically scheduled transmissions until the time when all preparation tasks are finished for all eNBs or the time when the resources are needed.

Including the activation time in the preparation request message may be an option if the activation time can be selected in such a way that the time until activation covers the time needed for all possible re-allocations and pre-emptions (if signalled in this way). It reduces the overhead as no particular activation message is needed.

In situations where the fastest possible response is needed, it would be fastest to have an explicit activation message that can be sent off as soon as possible after all eNBs have responded to the resource/prepare request.

During the activation phase, the eNB starts using the resources.

Compared with the current synchronized reconfiguration procedure of 3GPP, the main advantage of the embodiments of this invention may include that:

- It avoids preparation rejects by some Node Bs due to resource availability conflicts, which would necessitate repeated preparation attempts, in trial-error fashion. This is especially significant since such preparation would be expected to result in considerable overhead, in particular in a system such as the one disclosed in FIG. 3 since one eNB may be used by a plurality of MCEs, and another MCE may already have allocated part or all of the desired resources for SFN transmissions. Further, it can be expected that a number of eNB would need to perform resource reallocation of re-allocatable radio resources used for other traffic due to this. Such reallocation could in turn, e.g., be associated with a number of dedicated reconfiguration procedures for unicast UEs.
- It allows the eNB considerable time to reconfigure the resource usage between the resource requests (the preparation) and when it is used for the first time.
- It allows time to do pre-emption of SFN resources if needed, which may in turn trigger re-allocation of SFN resources that has been allocated by other MCEs.
- It proposes an optimized implicit activation phase, when eNB just tell when reconfiguration has been executed. This can be done because the resource allocation for DL-only SFN transmission does not need a truly synchronized operation. The main requirement is that the SFN transmission should not start until all requested resources in all eNBs have been set up.

Embodiments of the present invention allow that eNB really owns the radio resources in client server fashion, and allows the simplest logical network architecture where a multitude of clients may use radio resources in the eNB, and where different generations/variants of MCEs and eNB in one network can most easily be handled.

In an alternative exemplary embodiment of the present invention, the MCE about to set up an MBMS session do not inquire the eNBs, but other MCEs. This alternative introduces yet another network interface, between MCEs (schematically indicated by dashed lines in FIG. 3), which makes the architecture somewhat more complex. However, when compared with the above example, the benefit of this approach is that the total number of transactions, i.e., network signalling, needed for an inquiry phase can be reduced significantly.

In order to inquire the resource usage in another MCE, the MCE must first obtain information about which other MCEs that are managing one or more of the cells currently managed by the inquiring MCE. This may, for example, be done by defining a list of these MCE, which then is stored in each MCE and updated when appropriate. It may also be done by the MCE by inquiring each eNB which other MCE(s) are currently managing the eNB, e.g., by a standardised inquiry message.

The signalling could then be performed as follows. The MCE that wish to reserve resources (hereafter called MCE 1) may inquire the resource usage in another MCE (called MCE 2). In the inquiry message, the MCE 1 may:

- Define which cells are of interest;
- Define which area is of interest (with the assumption that the mapping from area to cells is predefined and the same in all MCE), and/or
- Ask MCE to report the resource usage in all cells.

When MCE1 receives the response from the one or more other MCEs, it may proceed with resource allocation as described above. In an alternative embodiment, MCE1 performs a pre-allocation of resources directed towards the MCE(s) to prevent them from allocating the resources. MCE1 may further be configured to command other MCEs to reallocate or pre-empt resources, e.g., based on an allocation retention priority as will be described below.

In the above examples, it has been assumed that there are resources available for allocation by the MCE. There are, however, situations where it is impossible to find an available resource suitable for SFN transmission for the entire desired coverage area. In such a situation, the MCE may use different actions and combinations of different actions to resolve the situation.

The MCE may choose to try to split the coverage area of the requested MBMS transmission into smaller areas and use different physical resources inside each smaller area. This would reduce the benefits of the SFN transmission in the boundaries of the established smaller areas, but otherwise maintain good SFN performance in the overall coverage area. Alternatively, more than one SFN transmission in a cell for the same multimedia service is set up. This would require a more complex user equipment. The MCE may also choose to perform either or both of these actions, on another existing eMBMS SFN transmission, to make room for the new eMBMS SFN transmission. The selection on which of the eMBMS SFN transmission to modify may be based on, for example, bit rate, the resource usage or the relative priority of the transmission.

Alternatively, the SFN may initiate pre-emption of SFN resources allocated by other MCEs, which may in turn initiate re-allocations of resources in order to do this. The MCE may be restricted to only pre-empt own transmissions, i.e., transmissions that are not managed by another MCE, although another option would be to let the MCE also be able to pre-empt transmissions managed by other MCEs as well.

Another possibility is to reuse the concept of allocation and retention priority used for Unicast transmission in 3GPP release 6 and earlier. This is defined by three parameters: Priority level, Pre-emption capability and Pre-emption vulnerability (as shown in Table 1).

TABLE 1

Allocation/Retention Priority.

| IE/Group Name | Presence | IE Type and Range Reference | Semantics Description |
|---|---|---|---|
| Priority level | M | INTEGER (0 ... 15) | This IE indicates the priority of the request. Usage: Value "0" means "Spare"; It shall be treated as a logical error if received. Values between "1" and "14" are ordered in decreasing order of priority, "1" being the highest and "14" the lowest. Value "15" means "No Priority". |
| Pre-emption capability | M | ENUMERATED (shall not trigger pre-emption, may trigger pre-emption) | |
| Pre-emption vulnerability | M | ENUMERATED (not pre-emptable, pre-emptable) | |

The allocation and retention priority could be used in a similar way as in 3GPP Rel-6, which is enclosed herein by reference. One difference is, however, that, according to the present invention, the MCE is fully aware of the resource situation in the eNB (after the inquiry phase) so the result is always predictable, i.e., the new request is never rejected but may pre-empt others.

In this case, the eNB shall first respond to the request from the MCE (as described above) and then notify the other MCE currently managing the pre-empted transmission that its transmission has been pre-empted.

The other MCE may then choose to pre-empt the transmission or try to re-allocate it to other communication resources. If trying to re-allocate it, it must start back at the inquiry phase to get full knowledge about the resource situation in the targeted cells.

In an alternative exemplary embodiment, the pre-emption could also be done in a particular pre-emption request procedure, performed between the inquiry signalling phase and the preparation phase. In this case, there might be a need to pre-allocate the pre-empted resources so that they will not be assigned to someone else.

If the allocation and retention priorities are used for pre-emption, they should be signalled. As with that solution, they may also be used to reduce the signalling.

If the allocation and retention priority are used for pre-emption, the eNB would also need to report allocation and retention priority for resources allocated for SFN transmission, when inquired according to the above. If allocation and retention priority for the current resource request is included, this could be used to reduce the signalling. Further, if available resources should be reported, only the resources that are not used and the resources that are being used but where the allocation and retention priorities allow for pre-emption should be reported. On the other hand, if the non-available resources are reported, only occupied resources that are allowed to be pre-empted should be reported.

A further possible solution when there are not enough resources for the MBMS service is to reject the MBMS service request all together. This selection may be based upon, for example, SFN area size, e.g., if the service can only be set up in a fraction of the desired area it can be rejected, or, alternatively, the MCE may signal to the entity requesting the service in which portion SFN transmission is possible. Further criteria for rejecting the service could include a situation where SFN transmission can be provided, however not with a sufficient bit rate. Even further, if the number of users interested in the MBMS service is small, the MCE may decide that unicast transmissions would be a more efficient way of using network resources, etc.

Further, in the detailed description above, eNBs have been commonly controlled by two or more MCEs. It is envisaged, however, that the present invention also is applicable in a situation where MCEs control separate sets of radio transmitters, i.e., there is no overlap. In such a situation, one MCE may inquire another regarding resource status for subsequent resource allocation from the other MCE in order to set up, e.g., a SFN transmission in a coverage area stretching coverage areas controlled by two or more MCEs.

In situations where only one MCE controls all eNBs involved in the setup of a new MBMS transmission, the inquiry according to the present invention is advantageous. Although the MCE in principle would be aware of current allocations of SFN resources in each eNB, rejections may arise from, e.g., hardware limitations, or allocations that cannot be reallocated in a simple manner, e.g., allocations of common channels such as control channels, even though the MCE as well, in principle has knowledge of current allocations in the radio transmitters it is using In the above description, an inquiring MCE has inquired all eNBs it is using. It is envisaged, however, that the MCE may have knowledge of which eNBs that are used by another MCE, and only perform the inquiry to those eNBs.

In the above description, the present invention has been described in connection with a specific terrestrial wireless communication system. There are, however, other systems utilising SFN downlink technologies, such as DVB-H, DMB and EPM-DAB, and the present invention is equally applicable for such technologies.

According to embodiments of the present invention, at least parts of a plurality of radio transmitters are being used by a coordination entity, such as an LTE Multi-cell/multicast entity. The method includes: sending an inquiry from said coordination entity, requesting a representation of communication resources available for allocation in each of at least a subset of said first set of radio transmitters, said subset being used by said coordination entity; obtaining a response to said inquiry, said response comprising a representation of available communication resources of said subset of radio transmitters; and based on said response, allocating communication resources of said first subset of radio transmitters. The communicated data may consist of point to multipoint multimedia broadcast and/or multicast transmissions, i.e., transmissions from one radio transmitter to a plurality of receivers.

When communication resources are to be allocated from a plurality of radio transmitters, wherein a coordination entity is using allocations of resources of said radio transmitters and in principle may have knowledge of existing resource allocations of said radio transmitters, there are situations when such allocations may be rejected anyway from one or more of the radio transmitters. These rejections may be disturbing for system operation for various reasons. One such situation is when it is critical to have specific allocations among all radio transmitters to obtain the desired system performance, i.e., the same resources of all radio transmitters are used for the allocation, e.g., the same frequency at the same time. One particular example of such a situation is when using single frequency mode (SFN) operation, allowing a receiver to receive the transmission from multiple transmitters simultaneously, since such transmissions from various radio transmitters add tip at the receiver to improve receiver performance. The allocation rejections may, e.g., arise from hardware limitations in one or more of the radio transmitters, or allocations that cannot be reallocated in a simple manner, e.g., allocations of common channels such as control channels. In embodiments of the present invention the inquiry step avoids or at least substantially reduces such rejections since the coordination entity is provided with information regarding which resources are available for allocation prior to actually performing the allocation.

An activation time at which said allocated resources are available for communication may be determined, i.e., at what time the actual data communication using the communication resources may commence. This has the advantage that the radio transmitters themselves may determine for how long they may use the resources for other communication before preparing the resources for the data communication.

The activation time may be set equal for all radio transmitters of said subset of radio transmitters. This has the advantage that the data communication may start simultaneously at all transmitters. For example, the activation time may be signalled to the transmitters from the coordination entity in the resource allocation message.

The radio transmitters may determine individual start times at which said resources are ready for communication of said data, and communicate these start times to the coordination entity, whereupon said activation time is determined based on said individual start times. This has the advantage that the activation time can be set at such a point of time that all transmitters will be ready to use the allocated resources. Further, this has the advantage that in situations when one radio transmitter may need a considerably longer time to prepare the resources for usage than other transmitters, and this is reflected in the activation time, the other transmitters may use the resources for other communication meanwhile.

The activation time may be determined so that the radio transmitters are allowed to reallocate and/or pre-empt existing allocations of said allocated communication resources. This has the advantage that by setting the activation time appropriately, the radio transmitters may have time to reallocate, e.g., semi persistently scheduled dedicated resources, which may take a considerable time since signalling with a plurality of user equipments is required to perform the reallocations. Alternatively, the activation time may not be set until the semi persistent allocation(s) has ended. If reallocation is not possible, a pre-emption of the resources may be performed instead.

The radio transmitters may be used by at least a first and a second coordination entity, said first coordination entity using a first set of said radio transmitters and said second coordination entity using a second set of said radio transmitters, and said second set at least partially overlaps said first set of radio transmitters. Consequently, the present invention is particularly suitable in a situation when a radio transmitter is used by more than one coordination entity and the probability of trying to allocate resources already allocated by another coordination entity may be substantially great.

The above descriptions are only exemplary embodiments of the present invention. The present invention, however, are not limited to such embodiments. Various changes, improvements and alternations can be made to the present invention without departing from the present invention, and these changes, improvements and alternations are intended to be covered by the protection scope of the present invention provided that they fall within the scope as defined in the appending claims and their equivalents.

What is claimed is:

1. A method for allocating communication resources for communicating data in a terrestrial wireless communication system comprising a first set of radio transmitters, at least part of said radio transmitters being used by a coordination entity, wherein the method comprises:
   sending an inquiry from said coordination entity, requesting a representation of communication resources available for allocation in each of at least a subset of said first set of radio transmitters, said subset being used by said coordination entity;
   obtaining a response to said inquiry, said response comprising a representation of available communication resources of said subset of radio transmitters; and
   allocating, based on said response, communication resources of said first subset of radio transmitters;
   wherein the method further comprises:
   determining an activation time at which said allocated resources are available for communication;
   wherein said activation time is set equal for all radio transmitters of said subset of radio transmitters, or
   said radio transmitters determine individual start times at which said resources are ready for communication of said data, and wherein said activation time is determined based on said individual start times.

2. The method according to claim 1, wherein said activation time is communicated to said radio transmitters together with said resource allocation.

3. The method according to claim 1, wherein said activation time is determined so that said radio transmitters have time to reallocate and/or pre-empt existing allocations of said allocated communication resources.

4. The method according to claim 3, wherein said existing allocations comprise one or more of a kind defined from the group: semi-permanently allocated dedicated resources, common channel resources, SFN (Single Frequency Network) resources, and specific resources.

5. The method according to claim 1, wherein said allocation of communication resources is an allocation of specific resources of said radio transmitters, and said specific communication resources are communication resources for Single Frequency Network (SFN) operation.

6. The method according to claim 1, wherein said radio transmitters are being used by at least a first and a second coordination entity, said first coordination entity using a first set of said radio transmitters and said second coordination entity using a second set of said radio transmitters.

7. The method according to claim 6, wherein said second set at least partially overlap said first set of radio transmitters.

8. The method according to claim 6, wherein said inquiry is sent from said first coordination entity to said second coordination entity.

9. The method according to claim 1, wherein said inquiry is sent to said subset of radio transmitters, and wherein said response to said inquiry comprises individual responses received from radio transmitters of said subset, and the responses from said radio transmitters are individually delayed in order to reduce momentary signalling.

10. The method according to claim 1, wherein said inquiry comprises at least one of the following: definition of inquired radio transmitters, definition of area of interest, and request for resource usage in all radio transmitters.

11. The method according to claim 1, wherein allocations are prioritised, and wherein said response to said inquiry further comprises a priority for already allocated communication resources.

12. The method according to claim 1, further comprising an activation step wherein said allocated resources are activated for said data communication.

13. The method according to claim 12, wherein an activation time is indicated in said response to said inquiry, said activation time being the time at which the allocated resources being ready for usage.

14. The method according to claim 13, wherein said activation times are indicated in responses to said resource allocation received from said radio transmitters.

15. The method according to claim 1, wherein said radio transmitters comprise part of radio base stations in a mobile cellular communication system; or transmitters in a digital audio and/or video broadcast network; or radio transceivers.

16. A communication system for communicating data in a terrestrial wireless communication system, comprising a first set of radio transmitters, at least part of said radio transmitters being used by a coordination entity, wherein the communication system comprises:
  means for sending an inquiry from said coordination entity, requesting a representation of communication resources available for allocation in each of at least a subset of said first set of radio transmitters, said subset being configured to be used by said coordination entity;
  means for obtaining a response to said inquiry, said response being configured to comprise a representation of available communication resources of said subset of radio transmitters; and
  means for allocating communication resources of said first subset of radio transmitters based on said response;
  wherein the communication system further comprises:
  means for determining an activation time at which said allocated resources are available for communication;
  wherein said activation time is set equal for all radio transmitters of said subset of radio transmitters, or
  said radio transmitters determine individual start times at which said resources are ready for communication of said data, and wherein said activation time is determined based on said individual start times.

17. A communication system to communicate data in a terrestrial wireless communication system, comprising:
  radio transmitters;
  a coordination entity, using at least part of said radio transmitters, sending an inquiry requesting a representation of communication resources available for allocation in each of at least a subset of said first set of radio transmitters, said subset configured to be used by said coordination entity, obtaining a response to said inquiry, said response comprising a representation of available communication resources of said subset of radio transmitters, allocating communication resources of said first subset of radio transmitters based on said response, and determining an activation time at which said allocated resources are available for communication,
  wherein said activation time is set equal for all radio transmitters of said subset of radio transmitters, or
  said radio transmitters determine individual start times at which said resources are ready for communication or said data, and wherein said activation time is determined based on said individual start times.

* * * * *